Patented Oct. 20, 1953

2,656,327

UNITED STATES PATENT OFFICE 2,656,327

PIGMENT PASTE

Alfred E. Van Wirt and George F. Jones, Glens Falls, N. Y., assignors to Imperial Paper and Color Corporation, a corporation of New York No Drawing. Application October 30, 1948, Serial No. 57,626

1 Claim. (Cl. 260—29.4)

This invention relates to pigment coloring and has for its object the provision of an improved pigmented coating composition in an aqueous medium for the production of pigmented coatings on textiles, paper, leather, roofing granules, and the like.

In accordance with this invention aqueous pigmented pastes free from emulsions and organic solvents may be prepared which have excellent washability, light resistance, stability and smudge or crock resistance by combining dispersions of pigment and resin which are anionic in character with a water soluble, thermosetting resin which is cationic in character.

Pigmented aqueous coating compositions containing water soluble or water dispersible binders or resins, such as albumen, casein, starch, and the common types of urea formaldehyde resins, are known and have been described before. All of these have inherent disadvantages of one sort or another which make them unsatisfactory for use in the decorating of textiles where the washability, lightfastness, stability, and crock resistance must necessarily be of a high order.

Present pigmented printing pastes of the oil in water emulsion type are not always satisfactory owing to emulsion break on the printing rolls and transfer of pigment from one phase to the other. Water in oil emulsion types present serious objections in that they are difficult to clean from equipment and do present some fire hazard. For these reasons a completely aqueous system free from emulsions is very desirable in the pigment printing of textiles as such a system completely eliminates the objectionable features inherent in the emulsion types.

It is believed that the combination between the anionic and cationic components of our system which occurs during drying of the coating results in greatly improved washability and crock resistance. It is thought that the reason for this lies in a stronger bond between pigment and resin and complete insolublization of other anionic components, such as anionic resin and thickeners. A good example of this may be found in carbon black formulations. This pigment which carries a strong negative charge on dispersed particles in an aqueous medium is extremely difficult to size with an anionic type of binder. These formulations usually smudge easily and have poor washability even though the binder has been converted to a water insoluble form. In our formulation employing a cationic resin, however, carbon black coatings have extremely good smudge resistance and excellent washability; the reason being, we believe, that the opposing charges on pigment particles and resin binder enable an unusually good bond to be obtained between the two. It has long been recognized that removal of thickeners or other film forming materials during washing tends to carry away portions of the pigmented coating, thus contributing to overall poor washability. By use of anionic thickeners and printing assistants in combination with a cationic binder, effective insolubilization of the anionic thickeners and resins is obtained upon drying and a final coating obtained which maintains its integrity upon washing.

The cationic resin may be any water dispersible or water soluble resin capable of being converted into an insoluble state either by heat treatment or chemical means, which has a positive charge on the resin particles, and which will coalesce on the cathode when a direct current is passed through a dilute solution or dispersion of it. For most purposes we prefer a water soluble cationic urea or melamine formaldehyde made by reacting urea or melamine and formaldehyde in the presence of a suitable amine and subsequently temporarily subjecting this product to a low pH.

The anionic resin may be any water soluble or water dispersible resin having a negative charge on the particles. It is used primarily to improve the printing strength. Several have been found to be effective, such as glycine modified urea formaldehyde, sulfite modified urea formaldehydes, sulfite modified melamine formaldehydes, vinyl chloride and acetate latices, acrylic polymers, and polystyrene latices. We prefer to use the polystyrene latices as they are relatively inexpensive and quite effective for most of the contemplated uses for this paste.

The thickener is of minor importance with respect to the final properties, but is necessary in order to obtain suitable printing viscosity. As set forth elsewhere in this specification, it is desirable to use an anionic type thickener so that a bond will be formed between thickener and cationic resin binder, thus effectively insolubilizing the thickener. Several thickeners have proved effective, including sodium alginate, sodium carboxymethylcellulose, Lakoe gum, and acetylated starches. For most contemplated uses sodium carboxymethylcellulose is the preferred thickener.

The pigment dispersion may be prepared by any one of several well known methods. It is desirable that the pigment be in a fine state of subdivision when incorporated into the formulation so that maximum color value can be obtained therefrom.

In those cases where a soft hand is necessary a suitable softener or plasticizer can be added. Softeners include glycerine, ethylene glycol, diethylene glycol and the polyethylene glycols of higher molecular weight, as exemplified by Carbide & Carbon Chemicals Corporation's "Carbowaxes." For most purposes we prefer a polyethylene glycol equivalent to "Carbowax 1540." Polyethylene glycols of molecular weights ranging from 200 to 4000 have been found satisfactory.

The ratio of anionic resin to cationic resin may be varied to some degree. There is a minimum limit, however, on the cationic resin below which complete coagulation of the anionic resin is obtained with resultant bodying and loss of flow. Amounts of cationic resin above this minimum appear to redisperse the anionic resin to some degree so that good flow is obtained. In combination with the anionic resin alone (polystyrene latex) this minimum has been found to be ⅓ the dry weight of the polystyrene latex. A progressive improvement in wet and dry crock resistance is obtained as the cationic resin is increased. For textile purposes, with a 5% pigment concentration, we use 15% polystyrene and 30% cationic urea formaldehyde based on the total paste. The amount of cationic resin required for lower pigment concentrations is somewhat less but does not go below 20% with 15% polystyrene.

The amount of anionic resin present primarily affects the printing strength. It can be varied in the formulation over a range between 5% and 15% based on the paste weight, to produce acceptable printing pastes. Below 5%, the printing strength falls off markedly. Amounts greater than 5%, up to and including 15%, produce progressively brighter and stronger prints. Little additional improvement is obtained above 15% so that amounts greater than this do not appear to be justified.

The thickener is used primarily to adjust the viscosity of the paste to a suitable printing consistency. The amount used depends to some extent on the pigment used and on the final use of the paste. For ordinary machine printing practical viscosities have been obtained with between 0.2% and 1.5% sodium carboxymethylcellulose (extra high viscosity type) based on the paste weight. The limiting factors on the amount used are the desired viscosity of the final paste and the type of pigment used.

The softener may be varied over a wide range depending on the hand desired. For textile purposes, 8% based on the paste weight is sufficient to produce a satisfactory hand. Amounts greater than 8% interfere with the curing of the resin and do not appreciably contribute to the hand. In addition to the improvement in hand, these materials of the glycol type act as stabilizers.

The water soluble cationic urea and melamine formaldehyde resins used in these pastes are made by condensing urea and/or melamine and formaldehyde in the presence of a primary or secondary amine or a hydroxy tertiary amine, such as triethanolamine, and then temporarily subjecting said condensation product to a low pH according to the method outlined by James and Pings in their pending patent application, Serial No. 46,191, filed August 25, 1948, now Patent No. 2,626,251. In accordance with said patent, the cationic resin may be prepared by using a reaction mixture comprising 1 mol of urea, from 2 to 3 mols of formaldehyde, at least one-third mol of amine, preferably from one-third to one-half mol of amine per mol of urea. The amines employed in accordance with the invention include all those water soluble compounds containing a trivalent nitrogen atom with an active hydrogen. They include such compounds as ammonia, methyl and dimethylamines, ethyl and diethyl amines, propyl and dipropyl amines and the mono- and di-butyl amines; also alkanol amines such as mono- and diethanolamines, and ether amines, such as morpholine. Further, certain water soluble hydroxylated tertiary aliphatic amines, such as triethanolamine and certain water soluble heterocyclic amines, such as pyridine and quinoline may be used in the process. Such resins to be suitable for use in our printing pastes must visibly coalesce at the cathode from a water solution when subjected to the action of a direct current according to the following procedure.

An 800 cc. beaker is fitted with a set of electrodes connected to a regular 6 volt storage battery. The anode is preferably platinum (although steel can be used) in the form of a rectangle 2" x 5". The cathode is a rectangular piece of 40 mesh steel screen having the same dimensions as the anode. The electrodes are placed one inch apart and 700 cc. of aqueous 5% resin solution are placed in the beaker. The circuit is closed and a potential of 6 volts is put across the electrodes.

If the resin is satisfactory, it will be observed to coalesce on the cathode as a white insoluble deposit. Unsatisfactory resins show either no coalescence on either electrode or coalesce on the anode. Resins meeting the above test can be considered to be positively charged or cationic resins. The ordinary alcohol modified or straight condensation products of urea or melamine and formaldehyde usually show no deposit at either electrode in the above test. There are types which are anionic and which will coalesce on the anode. These include specially modified urea and melamine formaldehydes of which the sulfite-modified types are an example, and aqueous dispersions of polystyrene, acrylic polymers and vinyl polymers.

A suitable cationic urea formaldehyde for use in our system may be made as follows.

75 gms. of urea (1 mol), 66 gms. of triethanolamine (⅓ mol) and 40 gms. of isopropyl alcohol (½ mol) are mixed and heated to 80° C. in a suitable container equipped with a stirrer, thermometer and reflux condenser. 121.6 gms. of 37% formalin and 45 gms. of paraformaldehyde (total 2.4 mols) are then added and the mixture heated to 80° C. The mixture is then stirred for 15 minutes with external heat removed. A sufficient quantity of approximately 32% hydrochloric acid is then added to bring the pH value to approximately 1.5±0.5. The mixture is stirred at this pH value for one minute and then neutralized to a pH of 6.0 with 30% sodium carbonate solution.

The neutralized resin is then concentrated under reduced pressure to a solids content of approximately 75%.

A suitable melamine formaldehyde for use in our system may be made as follows:

52.5 gms. of melamine (⅓ mol), 132.0 gms. triethanolamine (⅔ mol) and 132.5 gms. diethylene glycol (1 mol) are mixed and heated to 91° C. in a suitable container equipped with a stirrer, thermometer and reflux condenser. 304 gms. of 37% formalin (3 mols HCHO) and 79 gms. of paraformaldehyde (2 mols) are then added and the mixture heated to 80° C. The mixture is then stirred for 15 minutes with external heat removed. A sufficient quantity of approximately 32% hydrochloric acid is then added to bring the pH value to approximately 1.5±0.5. The mixture is stirred at this pH value for approximately one minute and then neutralized to a pH of 6 with 30% sodium carbonate solution. The neutralized resin is then concentrated under reduced pressure to a solids content of approximately 75%.

In compounding the paste we have found the following order of addition of the individual ingredients to be desirable but not absolutely essential.

(1) Dispersed pigment paste.
(2) Polystyrene latex.
(3) Cationic urea formaldehyde.
(4) Thickener.
(5) Polyethylene glycol softener.

The following general formula is for purposes of illustration. This is a typical formula for a pigmented paste.

|  | Per cent |
|---|---|
| Water dispersible pigment | 5.5 |
| Polystyrene latex (Dow 580 or equivalent) (dry basis) | 15.0 |
| Cationic urea formaldehyde (dry basis) | 30.0 |
| Thickener (sodium carboxymethylcellulose) | 1.0 |
| Polyethylene glycol (Carbowax 1540 or equivalent) | 7.0 |
| Water | 41.5 |
| Total | 100.0 |

The following formula, also for purposes of illustration, is a typical formula for the unpigmented paste or "clear" which is used to reduce the pigmented paste to pigment concentrations below that of the straight paste.

|  | Per cent |
|---|---|
| Polystyrene latex (Dow 580 or equivalent) (dry basis) | 15.0 |
| Cationic urea formaldehyde resin (dry basis) | 20.0 |
| Sodium carboxymethylcellulose | 2.0 |
| Polyethylene glycol (Carbowax 1540 or equivalent) | 7.0 |
| Water | 56.0 |
| Total | 100.0 |

Similar formulas can be compounded using cationic melamine formaldehyde in place of the urea type.

The pastes are printed on the desired object (cloth, paper, leather, etc.) by conventional means. The printed article is then dried and cured at a suitable temperature. The curing temperature can range from 250° F. to 400° F. or even higher, depending on the type of cationic resin used and whether an accelerator is present. Several of the common urea formaldehyde accelerators can be used, such as ammonium thiocyanate, toluidine sulfonic acids, ammonium salts of various acids, etc., to reduce the curing temperature or curing time at sacrifice of some paste stability. Melamine resins can be cured at lower temperatures than the urea types. When using urea type cationic resins without accelerators, a minimum curing temperature of 320° F. and a minimum curing time of three minutes have been found to be necessary. Higher curing temperatures can be used to reduce the time; for example, excellent results can be obtained in one minute at 380° F. With melamine resins a fairly satisfactory cure can be obtained in 3 minutes at 250° F. Higher temperatures reduce the curing time, as with the urea formaldehyde types.

In printing textiles, particularly cotton, it has been found desirable to dry at 230–250° F., wash for ½ minute in 1% soap at 50° C., rinse, and dry and then cure. After curing, it is desirable to put the cloth through a mechanical breaking device to produce maximum hand.

The above formulations can also be used for pigment dyeing of textiles by reducing the thickener to 0.5% or less. The pigmented paste is padded onto the cloth as in regular dyeing operations. The cloth is then dried, washed, cured and "broken" as in the printing operation.

This process produces pigment prints which have exceptionally good washability and crock resistance. Because of the good crock resistance at relatively high pigment concentrations, it is possible in many cases to print a complete range of patterns without resorting to dyestuffs to obtain the deeper, stronger shades.

Because of its aqueous nature and complete freedom from emulsions, it has distinct advantages over present emulsion types in printability and in the ease with which printing equipment can be cleaned after using it.

It is particularly well adapted to cotton printing.

We claim:

A pigmented coating composition comprising an aqueous continual external phase, a dispersed pigment, a thickener, a cationic water soluble resin which is produced by reacting 1 mol of urea with from 2 to 3 mols of formaldehyde in the presence of at least one-third mol of a compound selected from the group consisting of pyridine, quinoline, water soluble aliphatic amines having at least one hydrogen attached to the amino nitrogen and hydroxy tertiary aliphatic amines, until a solution is obtained and then acidifying the mixture to a pH between 0.5 and 2.0, and immediately neutralizing to a pH of from 6.0 to 7.0; and an anionic polymeric material of the group consisting of polystyrene, polyvinyl chloride and polyvinyl acetate, said anionic resin being present in an amount varying from 5% to 15% by weight based on the weight of the composition, said cationic resin being present in an amount sufficiently great to redisperse the anionic resin, the cationic resin of said composition being convertible to an insoluble state by heat.

ALFRED E. VAN WIRT.
GEORGE F. JONES.

References Cited in the file of this patent

UNITED STATES PATENTS

| Number | Name | Date |
|---|---|---|
| 2,138,226 | Dales et al. | Nov. 29, 1938 |
| 2,394,009 | Pollard | Feb. 5, 1946 |
| 2,407,376 | Maxwell | Sept. 10, 1946 |
| 2,413,163 | Bacon | Dec. 24, 1946 |
| 2,471,188 | Auten | May 24, 1949 |
| 2,474,909 | Olpin et al. | July 5, 1949 |

(Other references on following page)

UNITED STATES PATENTS

| Number | Name | Date |
|---|---|---|
| 2,492,702 | Neubert et al. | Dec. 27, 1949 |
| 2,511,113 | La Piana | June 13, 1950 |
| 2,563,897 | Wilson et al. | Aug. 14, 1951 |
| 2,563,898 | Wilson et al. | Aug. 14, 1951 |
| 2,607,750 | Wilson et al. | Aug. 19, 1952 |

FOREIGN PATENTS

| Number | Country | Date |
|---|---|---|
| 555,148 | Great Britain | Aug. 6, 1943 |

OTHER REFERENCES

"Carbowax Compounds and Polyethylene Glycols," pp. 3–7, pub. 1946 by Carbide and Carbon Chem. Corp., New York. (Copy in Div. 50 III C. C. C. I.)

"Polyamide Resin Suspensoids," Revision D, Oct. 20, 1950, p. 6, published by General Mills Inc. (Copy in Div. 50.)

Colloidal Behavior, Bogue, vol. 1, pgs. 324–326, published 1924 by McGraw-Hill. (Copy in Div. 50.)